United States Patent [19]

Krüger

[11] 4,261,678
[45] Apr. 14, 1981

[54] UNLOADING DEVICE FOR SHIPS, BUNKERS, STORAGE YARDS OR THE LIKE

[75] Inventor: Rolf Krüger, Lübeck, Fed. Rep. of Germany

[73] Assignee: O & K Orenstein & Koppel Aktiengesellschaft Werk Lübeck, Fed. Rep. of Germany

[21] Appl. No.: 27,817

[22] Filed: Apr. 6, 1979

[30] Foreign Application Priority Data

Apr. 10, 1978 [DE] Fed. Rep. of Germany ......... 2815480

[51] Int. Cl.³ .............................................. B65G 65/28
[52] U.S. Cl. .................................. 414/133; 37/190; 198/518; 414/139
[58] Field of Search .............. 414/137, 138, 139, 140, 414/325, 326, 327, 304, 305, 313, 133; 198/509, 511, 512, 513, 514, 515, 516, 517, 518; 37/189, 190, 191, 192, 108, 110

[56] References Cited

U.S. PATENT DOCUMENTS

| | | | |
|---|---|---|---|
| 2,769,539 | 11/1956 | Packman | 198/518 X |
| 3,390,473 | 7/1968 | Wilms et al. | 37/190 |
| 3,616,890 | 11/1971 | Pradon | 414/139 X |
| 3,645,020 | 2/1972 | Beslin et al. | 37/190 X |
| 3,828,915 | 8/1974 | Cox et al. | 414/139 X |

FOREIGN PATENT DOCUMENTS

| | | | |
|---|---|---|---|
| 1233329 | 1/1967 | Fed. Rep. of Germany | 414/139 |
| 699392 | 12/1965 | Italy | 414/133 |

Primary Examiner—Frank E. Werner
Attorney, Agent, or Firm—McGlew and Tuttle

[57] ABSTRACT

An unloading device for equipment such as ships, bunkers, storage yards or the like comprises an elevator which has a substantially vertical supporting structure with a lower pickup end and an upper delivery end and a conveyor mounted on the structure with an elevator section for conveying material substantially vertical along the support structure. The lower end of the support structure engages into a rotatable bucket wheel which is mounted on a supporting structure. The bucket wheel is mounted in an inclined position relative to the supporting structure preferably at an angle of 45° to the vertical axis of the supporting structure.

8 Claims, 4 Drawing Figures

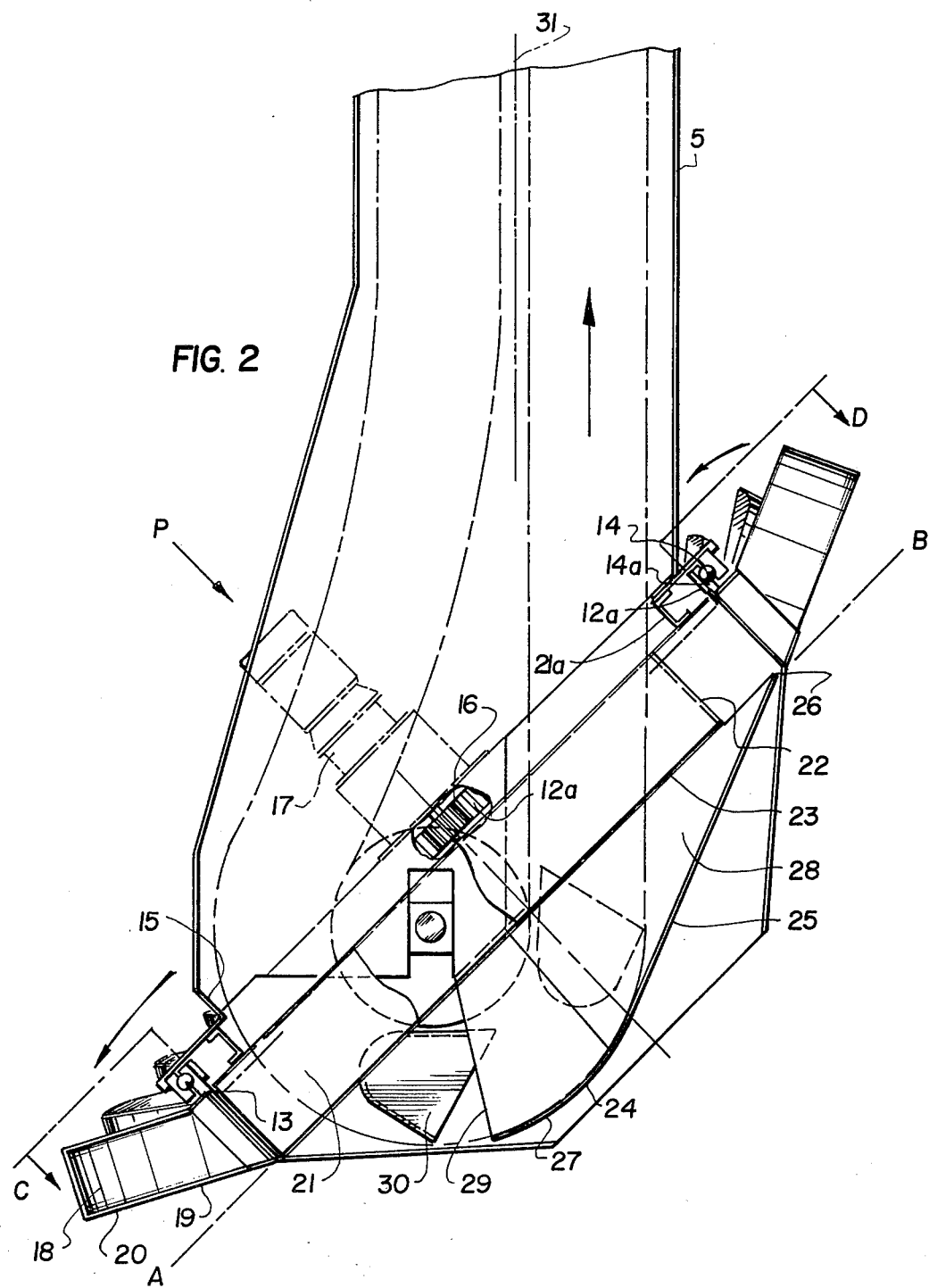

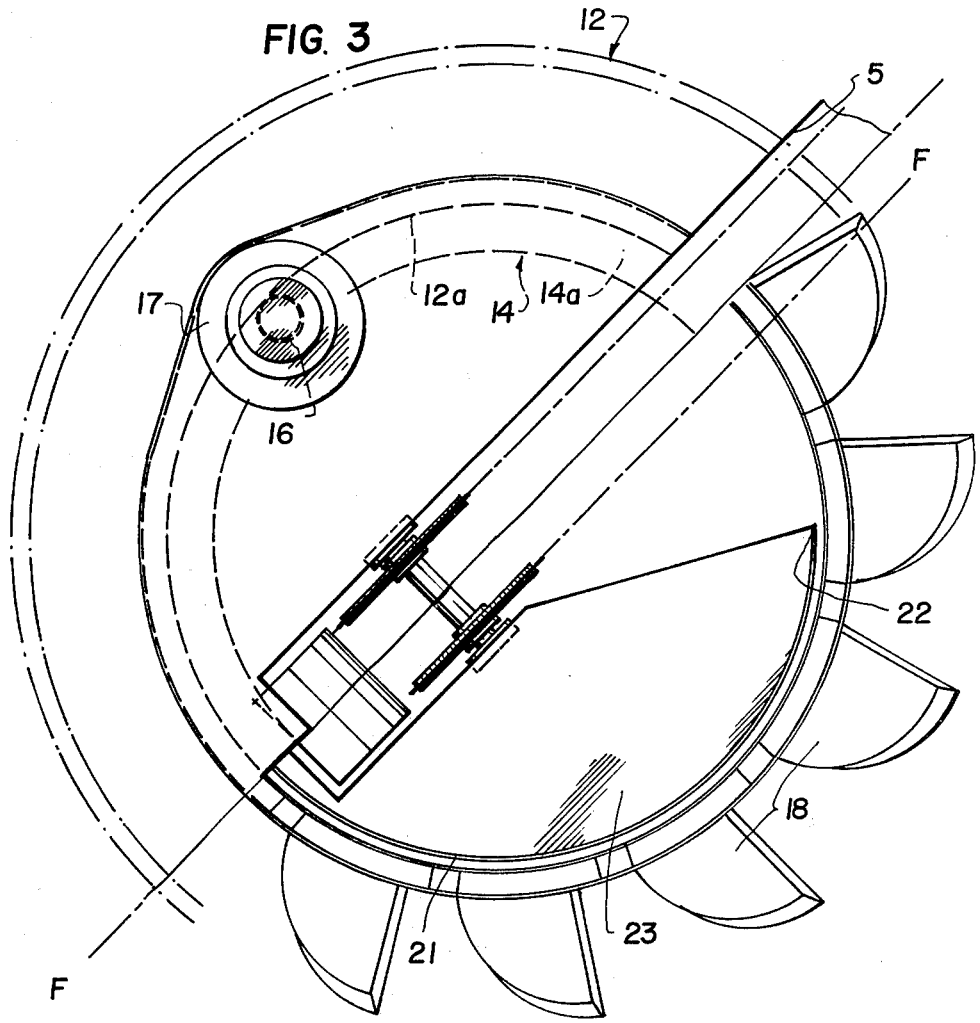

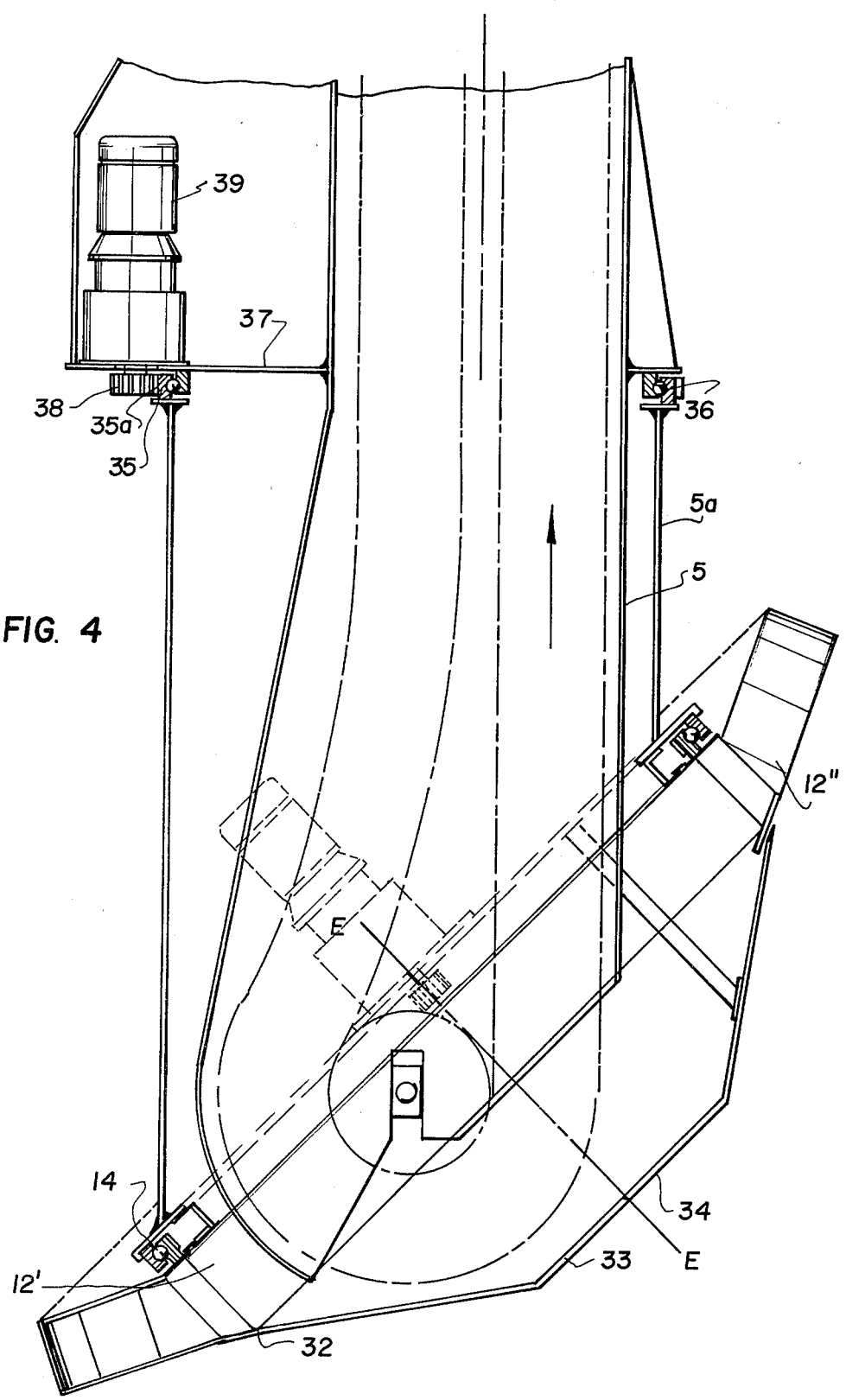

UNLOADING DEVICE FOR SHIPS, BUNKERS, STORAGE YARDS OR THE LIKE

FIELD AND BACKGROUND OF THE INVENTION

This invention relates in general to unloading devices and in particular to a new and useful loading device for ships, bunkers and storage yards and the like which comprise an elevator having a substantially vertical supporting structure with a lower pickup end on which a bucket wheel is mounted in an inclined position relative to the elevator.

DESCRIPTION OF THE PRIOR ART

The invention relates to an unloading device, e.g. for ships, bunkers and storage yards. German Offenlegungsschrift No. 1,961,717 (U.S. Pat. No. 3,616,890) describes a loading device for loading bulk material by means of an elevator which is supported by a substantially vertical arm which, in turn, is supported by a lifting mechanism. This mechanism supports a discharge device for discharging the bulk material from the elevator. At the lower end of the substantially vertical arm, an element rotatable about the axis of this arm is provided carrying buckets which are disposed substantially at the same level as the lower end of the elevator and designed in such a manner that during their rotation they displace the bulk material to the center. The rotary element extends horizontally. The vertical arm carries a mechanism for driving the rotary elements. In the zone of its lower end the vertical arm carries a circular plate which is provided with two tracks. One track absorbs the vertical forces and the other track absorbs the horizontal forces of a rim which is mounted above the circular plate and supported on the track through rollers. Four obliquely downwardly extending arms carrying a larger rim are connected to the first-mentioned rim. Four trough-shaped moldboards or shovels are secured with their upper portions to the larger rim. The lower portions of the trough-shaped moldboards or shovels are connected to each other by another rim which is disposed coaxially therebelow and has a smaller diameter than the rim disposed above. The moldboards or their edges extend arcuately from the upper rim to the lower rim. The uppermost rim, which is mounted on the circular plate, is provided with an internal gear meshing with a drive pinion of a drive wheel which is secured to the vertical arm. The revolving shovels are intended for separating the material placed on the storage yard and for pushing during their further rotation toward the center of the shovel wheel. There, the material is picked up by the buckets of two-bucket chains which are mounted in the supporting frame of the arm. The two bucket chains extend in the same plane and are guided by return pulleys provided in the lower part of the elevator. The bucket chains run in opposite directions so that in their lowermost position the buckets of both chains move to the center of the rotary element. The provision of two bucket chains elevator is expensive not only because of the necessity of mounting two chains and two drives, but also in view of the design of the supporting framework of the elevator which must have a correspondingly large cross section. This also makes difficult the mounting of the elevator supporting structure on its own supporting construction. In practice, the rotary element carrying the shovels must work exactly in the horizontal plane since with an inclined position, the material would not be displaced to the pickup range of the circulating buckets. Because of the relatively large diameter of its upper rim, the rotary collecting element cannot reach the material in bottom corners of bunkers or the like.

German Auslegeschrift No. 1,261,071 describes an unloading device for ships, storage places or the like, comprising a pivotless bucket device through the hollow center area of which the lower end of an elevator having the form of a bucket belt conveyor extends. The lower end of the elevator comprises a fixed arcuate member which is provided with rollers and secured to the supporting structure of the elevator. The buckets discharge the material in the upper zone of their circular path. To better guide the material in this zone, a connection funnel is secured to the supporting structure of the elevator, which funnel is disposed between the starting area of the buckets and the filling area of the belt buckets. The bucket device comprises a bucket wheel. The elevator cannot be inclined and is bound to the vertical position of the bucket wheel. Material in the corner areas of storage yards, bunkers, or the like, cannot be picked up by the loading device.

German Pat. No. 1,431,753 discloses a ship unloader for bulk material comprising a boom and a vertical framework associated therewith. The framework supports an elevator which is pivotable about its longitudinal axis. In addition, the vertical framework supports a bucket wheel which is mounted in overhung position on its lower end. Thus, the vertical framework is designed as a hollow beam which is pivotable about its longitudinal axis. The conveying element of the elevator is a rubber belt cup element disposed in the interior of the elevator. At the lower end of the hollow beam, a lateral extension is provided on which the bucket wheel is mounted by means of a large antifriction bearing. The bearing as well as the drive wheel and the pinion of the bucket wheel may be accommodated in the fixed part of the bucket wheel. The prior art ship unloader may be provided in addition with a trimming shovel by which the material can be displaced to the pickup area of the bucket wheel in cases where the bucket wheel has to work in corner areas. The device of the prior art is very expensive in construction because of the overhung mounting of the bucket wheel and the provision of a trimming shovel.

German Pat. No. 1,233,329 describes a bulk material unloader for ships which can travel along a portal on the quay by means of an upper carrying chassis. The device comprises an elevator in the form of a shaft, and an endless belt bucket conveyor mounted therein.

The belt bucket conveyor discharges the material on a belt of a belt jib by which the material is removed. The shaft carries in its lower portion a surrounding framework which is directed downwardly in the manner of tongs. On the outer part of the tongs a bucket wheel is mounted, again in an overhung position and inclined in the direction of the lower end of the shaft. The drive of the bucket wheel is provided between the wheel and the lower end of the tongue shaped member. From the drive accommodated in this intermediate space, an articulated shaft leads to the upper part of the tongue-like member and therefrom to a transmission mechanism provided in the shaft. The bucket wheel is enclosed on both sides by metal sheets. The metal sheet facing the shaft is provided with openings through which the material can pass through a chute into the buckets of the belt bucket conveyor. Instead of one bucket wheel also two bucket wheels may be provided, opposite each other and secured to the tongue-like member. The lower parts of the inclined bucket wheel face each other and are located relatively deep below the lower end of the belt bucket conveyor. The mounting and arrangemnt of the drive of the bucket wheel are difficult in construction and require a particularly expensive construction. Because of the particular inclination of the bucket wheel, the work with this bulk material unloading device in a corner area of a ship is difficult. In particular the material from the bottom corner areas cannot be removed without auxiliary means.

SUMMARY OF THE INVENTION

The invention is directed to an unloading device which would be as inexpensive as possible and of a design permitting removal of material from all areas of a storage space such as ship bunkers, particularly from the corner areas of such spaces with a single device and without difficulties and complications. At the same time the device should be designed in a simple manner, that is comprising a minimum of parts and be of as light construction as to permit an equally light construction of the supporting structure for the inventive unloading device. Finally, the operation of the inventive device must not impose particular requirements on the operators. To this end and in accordance with the invention, it is provided that the bucket wheel is inclined relative to the elevator. The angle of inclination relative to the vertical or horizontal may be about 45°. The inventive device has the advantage that corner areas of storage places can be emptied without affecting the elevating capacity and without imposing particular requirements on the skill of the operators. The bucket wheel can be adjusted in such a manner that even remote spaces of a bunker can be reached. At the same time, the center of gravity of the bucket wheel is located practically in the axis of the elevator so that the elevator and its bearings have to absorb tilting forces only to a small extent. This results in a light construction of the elevator which is equipped with a single conveying means.

According to a development of the invention, the buckets may be inclined relative to the plane of the bucket wheel, in the direction of the elevator. This increases the receiving capacity of the buckets since in the pickup area of the bucket wheel, that is in the lowermost position of the buckets, their side edges form only a minimum angle with the bottom of the storage space. On the other hand, in their uppermost position the buckets extend almost vertically so that the material drops from the buckets securely and completely. Due to the inclination of the buckets, an additional swinging of the support is made possible in spite of the inclined position of the bucket wheel.

Various designs of the inventive device may be provided. In one embodiment, the buckets are enclosed on their bottom side both in the pickup area and along a greater part of their circular path, by a simple chute which is secured to the supporting structure and whose lower rim is connected to an inclined discharge funnel having a central portion provided with a downwardly protruding portion through which the take-up elements such as buckets of the elevator pass at the tail end of the conveyor. In this embodiment, the bucket wheel, the transfer chute, and the take-up elements of the elevator, such as buckets, are concentrated in a very narrow space, that is they are accommodated in a space saving manner. This results in vary small dimensions of the bucket wheel and of the tail end of the elevator.

In another embodiment of the invention, the bucket wheel is closed on its underside by a tub. In this way, a receiving chamber is formed at the lower end of the elevator, wherefrom the elevator removes the picked up material.

One embodiment provides that the tub is firmly connected to the bucket wheel, thus rotates with the bucket wheel. The material picked up by the bucket is moved along a circular path during the rotation of the bucket wheel or the tub, and passes into the take-up area of the elevator repeatedly. In another embodiment, the tub is firmly connected to the support of the bucket wheel. This results in a lighter construction of the bearings of the bucket wheel.

Depending on the requirements imposed on the support or the supporting structure of the elevator, the bucket wheel may be supported in various manners. A simple and neat construction is that the bucket wheel is connected to its support at the upper circumference through a ball-bearing swivel and is provided in this area with an internal gear meshing with a pinion of a drive which is mounted on the support.

To facilitate the work of the bucket wheel, its support may be of tubular design and pivotable about an axis extending in the longitudinal direction of the elevator. With such a device, the pickup range of the bucket wheel can be adjusted in a very simple manner in any position relative to the elevator. In other words, the pick-up range of the bucket wheel can be adjusted in any direction independently of the position of the elevator. Due to this arrangement, complicated transfer mechanism at the head end of the elevator are saved. To reduce the horizontal dimensions of the elevator and thus to make the elevator more mobile irrespective of the local conditions, the return section of the elevator may be inwardly deflected in its lower portion, in the direction of the elevating section. This reduces the overall cross-section of the elevator above this location. To facilitate this design, the elevator may be equipped with a roller chain, the guidance of which in the area of the deflection is relatively simple.

To facilitate the operation of the inventive device under very unfavorable conditions of removing material from bottom corners, the elevator may be disposed eccentrically of the bucket wheel.

Accordingly it is an object of the invention to provide an unloading device for equipment such as ships, bunkers, storage yards and the like which comprises an elevator having a substantially vertical supporting structure with a lower pickup end and an upper delivery end and a conveyor therein with an elevator section for conveying material substantially vertically within the support structure and including a bucket wheel into which the lower end of the elevator projects which is mounted on the elevator in an inclined position relative thereto.

A further object of the invention is to provide an unloading device which is simple in design, rugged in construction and economical to manufacture.

The various features of novelty which characterize the invention are pointed out with particularity in the claims annexed to and forming a part of this disclosure. For a better understanding of this invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 2 is an enlarged view of the lower end of the elevator of the unloading device shown in FIG. 1;

FIG. 3 is a section taken along the line C-D of FIG. 2; and

FIG. 4 is a view similar to FIG. 1 showing two separate additional embodiments of the invention.

GENERAL DESCRIPTION OF PREFERRED EMBODIMENTS

Figure 1:
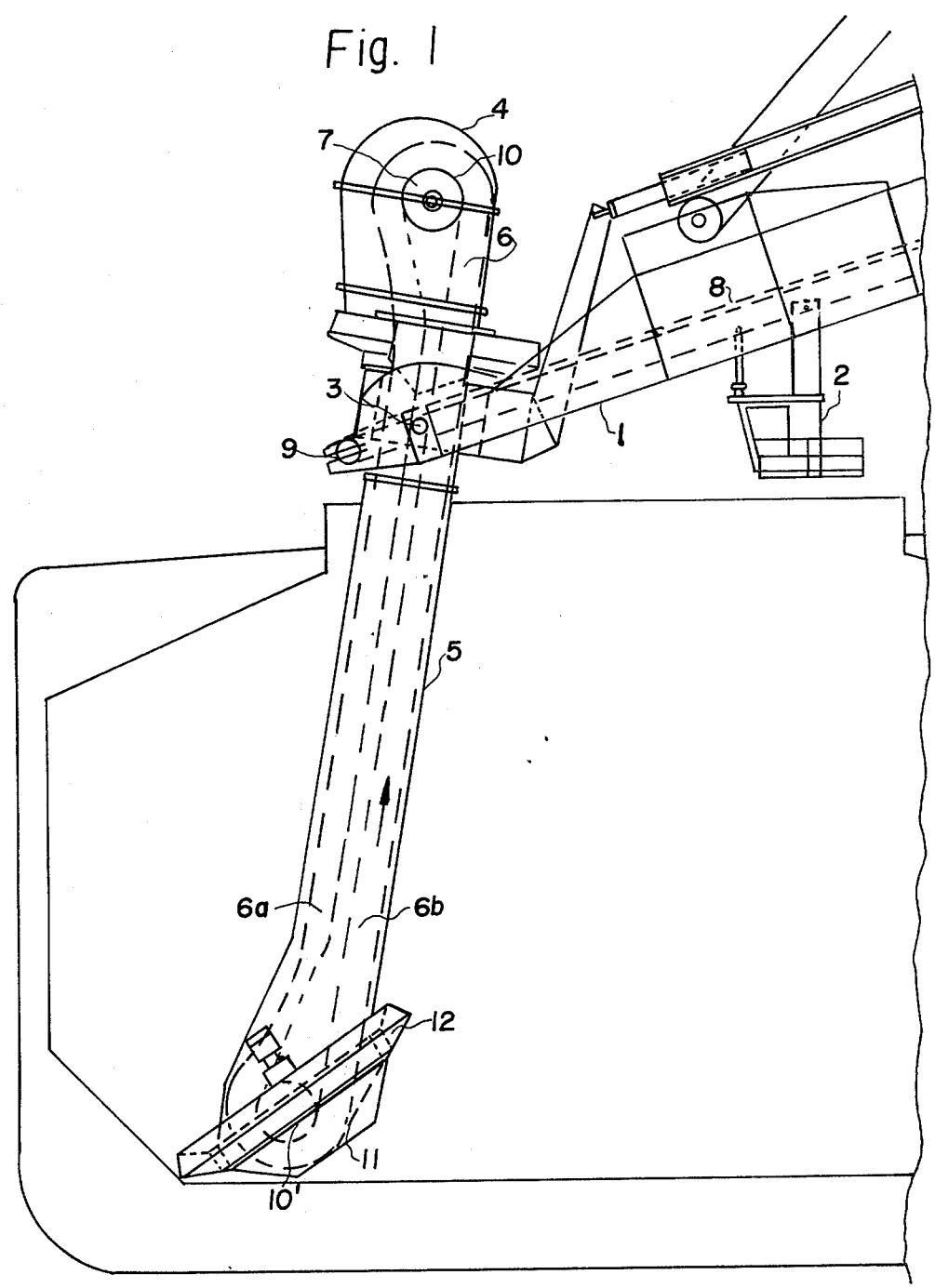
FIG. 1 is a schematic side elevational view of a ship with an unloading device therefor constructed in accordance with the invention.

Referring to the drawings in particular the invention embodied therein in FIG. 1 comprises an unloading device for equipment such as ships, bunkers, storage yards or the like which comprises an elevator 6 having a substantially vertical supporting structure or tubular housing 5 with a lower pickup end and an upper or top delivery end. The elevator 6 includes a conveyor therein with an elevator section 6b for conveying material vertically within the supporting structure 5. The lower end of the supporting structure projects into a bucket wheel 12 which is mounted in an inclined position relative to the elevator 6.

A take-up elevator 4 pivotable about an axis 3 is secured to the front end of a boom 1 carrying also the operator's cabin 2. The elevator 4 comprises a tubular housing or support 5 within which an elevator or endless bucket conveyor 6 is guided over respective upper and lower guide and return pulleys 10 and 10'. In a manner not shown, at its head end 7, the elevator discharges the material onto a conveyor 8 which is mounted on boom 1 and guided about a front return roller 9.

The lower return pulley 10' of elevator 6 is mounted, in a manner known per se in the lower end portion of support 5. Elevator 6 projects by its lower end 11 into an inclined bucket wheel 12. In the embodiment of FIGS. 1, 2 and 3, bucket wheel 12 is connected on its upper rim 13 to the lower end 15 of the support 5, through a ball-bearing swivel gear 14. The inner race 14a of the ball-bearing swivel gear 14 is secured to the upper rim 13 of bucket wheel 12 and provided with an internal gear 12a meshing with a drive pinion 16 of the eccentrically mounted drive 17.

The plane A-B, indicated by a dot-dash line and which may be called the plane of the bucket wheel 12, is inclined relative to the vertical and thus also relative to the bottom of the ship bunker by about 45°. Other inclinations are also possible.

Buckets 18, which each have discharge openings radially inwardly of the bucket wheel, are inclined relative to the bucket wheel plane A-B, or relative to the axis of the bucket wheel, so that the lower edges 19 form only a small angle with the horizontal.

Along the pickup range 20 of the buckets wheel and along the greater part of the circular path, the buckets are closed at their bottom or discharge side by a circular chute 21 extending up to the top portion of the bucket wheel.

The circular chute 21 terminates at 22. It is secured by a closed intermediate ring 21a to support 5. At its lower edge, the circular chute 21 is connected to an inclined chute sheet 23 closing the interior of the bucket wheel from below. The inclined chute sheet 23 has a protuberant portion 24 which is formed, on its underside, made of an inclined metal sheet 25 extending from edge 26 in the upper area of circular chute 21 obliquely downwardly and then blends into an arcuate portion 27. On its both side edges, chute sheet 25 is connected to side walls 28 which are connected, at their opposite side, to chute sheet 23. The protuberant portion is open at its lower end 29 and fitted to the profile of the take-up elements or buckets 30 of elevator 6 passing therethrough. In the example, the takeup elements 30 are buckets. The constructional parts 21 to 29 form a discharge funnel with a feeding chute for the buckets 30 conformed to the take-up elements 30 of elevator 6.

The support 5 of elevator 6 may be of tubular design and pivotable about an axis 31 extending in the longitudinal direction of the elevator. For this purpose, the support may be correspondingly mounted on boom 1.

To minimize the cross-section of the support, the return section of elevator 6 may be deflected inwardly in the area 6a, relative to the elevating section 6b. To facilitate the guidance of elevator 6 in such a design, the elevator may be equipped with a roller chain.

During rotation of bucket wheel 12, the material is picked up by the inclined buckets 18 and, in a known manner, after passing beyond location 22, are discharged into the discharge funnel and the trough-like protuberance. There the material is taken up by the buckets.

The receiving part of elevator 6 along with bucket wheel 12 form a very small take-up device at the pickup location and can be brought without any difficulties to any place within the bunker to be emptied. The pickup device is of relatively light construction and simple in design. The operation may be easily supervised.

FIG. 4 shows the lower end of an unloading device which may be provided instead of that of FIGS. 2 and 3. Two embodiments are shown in FIG. 4, in cross-sectional views, to the right and to the left of plane EE.

In the embodiment shown at the left hand side of sectional plane E—E, a tub 33 is secured to the underside 32 of a bucket wheel 12'. The bucket wheel 12' is not enclosed by a chute. The material picked up by the buckets is pushed into tub 33 and there taken up by elevator 6.

At the right hand side of plane EE, an embodiment is shown in which tub 34 is not firmly connected to bucket wheel 12" but secured to support 5. Consequently, tub 34 does not rotate with the rotatable buckets wheel 12". Here again, the material placed on the bottom is picked up by the buckets 12 and pushed into tube 34 to be taken up by elevator 6.

The embodiments of FIG. 4 further differ from the embodiment of FIGS. 1 to 3 in that a tubular supporting construction part 5a is provided surrounding the lower end of support 5 and carrying, through a ball-bearing swivel gear 14, the bucket wheel 12' or 12" and, in the embodiment shown to the right of sectional plane EE, also the tub 34.

In its upper portion, tubular supporting structure 5a is connected to the outer race 35 of a ball bearing swivel gear 36 whose other race is secured to supporting structure 5, or to an extension 37 of this structure. Outer race 35, through which tubular connection 5a is secured, is provided with a toothed rim 35a meshing with pinion 38 of a swivel drive 39. In this way, support 5a of the buckets wheel can be pivoted, along with the tub, about the lower end of tubular supporting structure 5 and through any angle, whereby the pickup range of the elevator can be adjusted to the required conditions.

While specific embodiments of the invention have been shown and described in detail to illustrate the application of the principles of the invention, it will be understood that the invention may be embodied otherwise without departing from such principles.

What is claimed is:

1. An unloading device for equipment such as ships, bunkers, and storage yards, comprising an elevator having a substantially vertical supporting structure with a lower pickup end and an upper delivery end, a conveyor mounted on said supporting structure having a plurality of elevator pick-up elements for conveying material vertically, a bucket wheel into which said lower pick-up end of said elevator projects rotatably mounted on said elevator supporting structure, said bucket wheel including a lower edge disposed on an inclined plane relative to the horizontal and to said elevator and having a plurality of pick-up buckets which extend obliquely outwardly relative to the inclined plane of the bucket wheel, each of said pick-up buckets having a discharge opening radially inwardly of said bucket wheel, a circular chute connected to said supporting structure and covering those bucket discharge openings of said bucket wheel adjacent a lower pick-up part of said bucket wheel, and a discharge funnel below said bucket wheel connected to said chute having a middle portion including a downwardly protuberant trough-like part cooperating with said elevator and into which said elevator pick-up elements pass to convey material vertically from said bucket wheel.

2. An unloading device according to claim 1, wherein said bucket wheel has an angle of inclination of about 45°.

3. An unloading device according to claim 1, wherein said bucket wheel includes an upper circumferentially extending portion, said supporting structure including a ball bearing supporting said circumferential portion for pivotal movement, said circumferential portion having an internal gear rim and a drive for said gear rim mounted on said supporting structure including a pinion engaged with said gear rim.

4. An unloading device according to claim 1, wherein said supporting structure comprises a tubular housing and a support member pivotally supporting said housing about the longitudinal axis of said supporting structure.

5. An unloading device according to claim 1, wherein said supporting structure includes an upper tubular portion and a lower portion pivotally mounted on said upper tubular portion for rotation about the axis of said tubular portion and a drive member mounted on said upper tubular portion for rotation about the axis of said upper tubular portion, and a drive member mounted on said upper portion and engaged with said lower pivotal portion to rotate it about the longitudinal axis of said upper portion.

6. An unloading device according to claim 1, wherein said supporting structure includes a tubular housing having a substantially uniform diameter upper portion and a lower portion offset outwardly, said conveyor comprising an endless bucket chain conveyor, an upper guide pulley in said supporting structure and a lower guide pulley adjacent the bottom end of said supporting structure in the outwardly extending area, said pick-up elements being buckets extended outwardly during their downward travel through said outwardly extending portion of said housing and being directed inwardly in the upper portion.

7. A device according to claim 6, wherein said upper portion includes a roller chain.

8. An unloading device according to claim 7, wherein said upper portion is disposed eccentrically relative to the center of the bucket wheel.

* * * * *